United States Patent Office 3,505,879
Patented Apr. 14, 1970

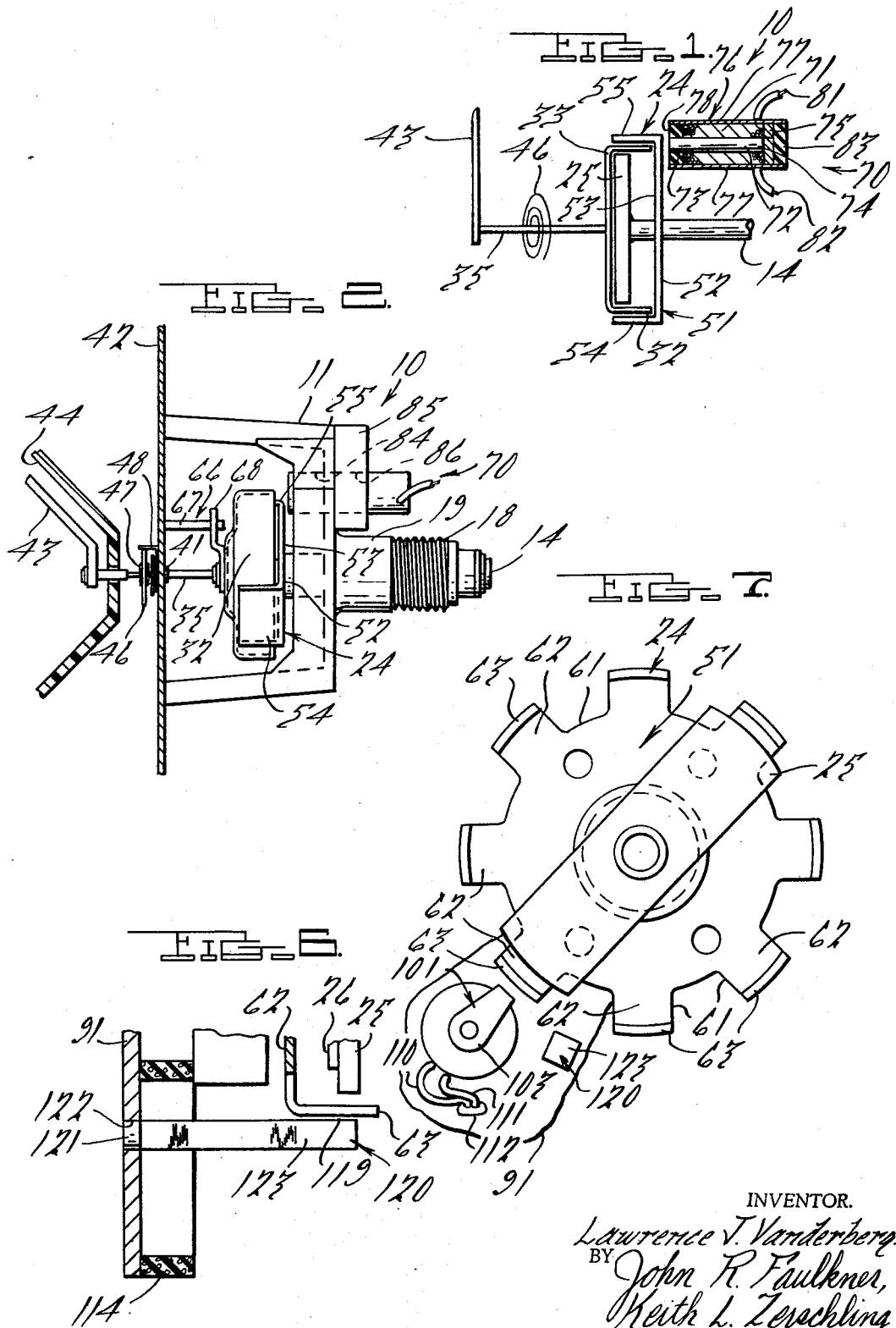

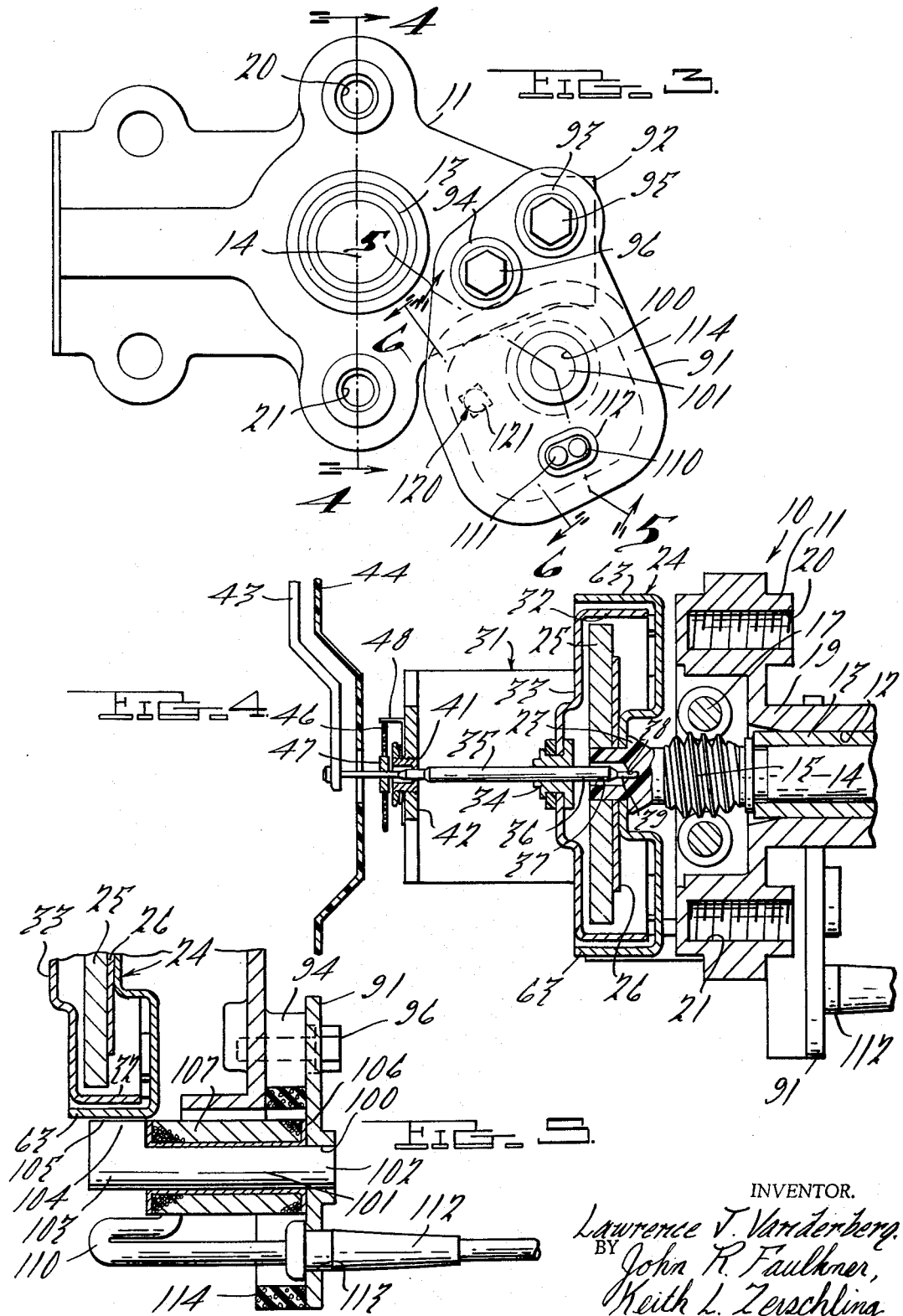

3,505,879
ELECTRICAL GENERATOR INCLUDING COMPONENTS OF AN AUTOMOTIVE VEHICLE MECHANICAL SPEEDOMETER
Lawrence J. Vanderberg, Ann Arbor, Mich., assignor to Ford Motor Company, Dearborn, Mich., a corporation of Delaware
Filed July 31, 1968, Ser. No. 749,091
Int. Cl. G01p 3/22
U.S. Cl. 73—493                 10 Claims

ABSTRACT OF THE DISCLOSURE

An electrical generator for producing periodically varying electrical energy for use in an automotive vehicle and having a frequency proportional to vehicle speed in which the stator of the electrical generator is mounted adjacent to or on the frame of a mechanical speedometer and includes means for producing a magnetic flux through an output coil or winding. The rotor of the electrical generator is the rotor of the mechanical speedometer that includes a magnetic and a body constructed of ferromagnetic material, commonly referred to as a flux collector. The magnet and the flux collector cooperate with means positioned in the speedometer for indicating the speed of the vehicle. The ferromagnetic means or flux collector also varies the flux through the output coil or winding periodically at a frequency proportional to the speed of rotation of this body of ferromagnetic material or the speed of rotation of the rotor of the speedometer thereby producing in the output coil or winding periodically varying electrical energy having a frequency proportional to vehicle speed.

BACKGROUND OF THE INVENTION

There have been many electrical generators developed in the prior art for producing an output voltage having a frequency proportional to vehicle speed. The output voltage of these generators may be used to perform different control functions in the automotive vehicle including providing an input signal to an electrical or electronic automatic speed control system.

The electrical generators known to the applicant have usually been separate electrical generators which employ their own output windings and magnetic fields and also mechanical components coupled to the output winding and the magnetic field for producing relative rotation between them. As a result, these separate components are costly and need to be separately mounted in some convenient position within the automatic vehicle. In many cases these electrical generators are driven directly from the wheels of the vehicle and are positioned adjacent thereto or are positioned somewhere in the driveline of the automotive vehicle so that they may be operated at a speed proportional to vehicle speed.

In other prior art mechanisms known to the applicant, electrical generators are positioned in a two-part electrical speedometer cable in which the standard speedometer cable is split with one portion coupled to the driveline or transmission of the vehicle for driving the field or armature of the electrical generator at a speed proportional to the vehicle speed. This generator, of course, has separate output windings and a separate field winding for producing an output voltage as the speedometer cable is rotated. These generators also have means that couple the other portion of the speedometer cable to the electrical generator so that the speedometer drive shaft may be driven at a speed proportional to vehicle speed.

The present invention provides a very uncomplicated and inexpensive electrical generator for producing a periodically varying output voltage having a frequency proportional to vehicle speed. This output may be used in various control functions in the automotive vehicle particularly to control an automatic speed control device. The electrical generator of the present invention employs component parts of the mechanical speedometer of the vehicle for producing a time varying flux in a coil or output winding. This coil or output winding is mounted adjacent to a body of ferromagnetic material affixed to the speedometer shaft and includes flux producing means coupled to it. Rotation of the speedometer shaft varies the flux linking the coil on output winding at a frequency proportional to the speed of rotation of the speedometer shaft. The electrical generator of the present invention, therefore, includes component parts already present in an automotive vehicle for producing the above mentioned periodically varying output voltage thereby substantially reducing the cost both in labor and materials of such an electrical generator.

SUMMARY OF THE INVENTION

In the present invention a mechanical speedometer is provided having a frame that is preferably constructed of a non-ferromagnetic material. A rotor including a shaft is mounted in the frame and is adapted to be driven, preferably by a speedometer cable coupled to the vehicle driveline, at a speed proportional to vehicle speed. The rotor may include a magnet and a ferromagnetic means in the form of a flux collector that cooperates with a means for indicating the speed of the vehicle. This latter mentioned means may commonly take the form of an eddy current speed cup cooperating with the magnet and ferromagnetic means or flux collector mounted on the shaft of the speedometer for producing a torque on the eddy current speed cup proportional to vehicle speed. The stator of the electrical generator of the present invention preferably takes the form of a permanent magnet that produces a magnetic flux through output windings of the generator and is mounted in close proximity to the body of ferromagnetic material or flux collector. This magnet is polarized in such a way that as the body of ferromagnetic material or flux collector attached to the shaft of the speedometer is rotated, the flux linking the output winding or coil is changed or varied at a frequency proportional to the frequency of rotation of the speedometer shaft. As a result, periodically varying electrical energy is produced in the output coil or winding having a frequency proportional to vehicle speed.

The flux collector of the speedometer may be of ordinary form in which two oppositely extending teeth or poles are provided and the magnet and output coil may be mounted in the speedometer frame in a position adjacent to this flux collector, with the magnet polarized in a direction that is substantially parallel to the shaft of the speedometer. The output coil may be position over the permanent magnet and ferromagnetic material may enclose the coil and be in engagement with one end or pole of the permanent magnet. The other end of the permanent magnet is arranged with respect to such ferromagnetic material that an air gap is provided between the ferromagnetic material encasing the output coil and this end or pole of the permanent magnet. This end or pole of the permanent magnet is positioned adjacent the flux collector of the speedometer so that rotation of the flux collector causes the teeth of the flux collector to periodically pass through the flux coupling this pole of the permanent magnet and the ferromagnetic material encasing the permanent magnet and the coil. Rotation of the flux collector thereby alters or varies the flux coupling the winding or output coil at a frequency proportional to the speed of rotation of the flux collector and hence proportional to the speed of the vehicle.

In another form of the invention, a permanent magnet is provided that is positioned radially outwardly of teeth on the ferromagnet body of flux collector. These teeth may extend in an axial direction with respect to the axis of the permanent magnet and the axis of the speedometer shaft. One pole of the permanent magnet is positioned closely adjacent these teeth and the other pole is mounted in a ferromagnetic plate attached to the speedometer frame. A return path means for the flux produced by the permanent magnet is provided by a separate ferromagnetic means affixed to the plate, spaced from the permanent magnet and extending in a direction parallel to the axis of the permanent magnet and the axis of the shaft of the speedometer. This ferromagnetic means may be in the form of a ferromagnetic pin which also is positioned radially outwardly of the axially extending teeth of the body of ferromagnetic material or flux collector affixed to the shaft of the speedometer. It is spaced circumferentially from the permanent magnet.

As a result, a flux path is completed from one pole of the permanent magnet through the ferromagnetic plate, through the ferromagnetic pin, into one of the axially extending teeth of the flux collector, out through another axially tooth of the flux collector and into the opposite pole of the permanent magnet. Magnetic flux, therefore, is linked with the output winding or coil of the electrical generator and as the ferromagnetic means or flux collecter attached to the input shaft of the speedometer is rotated, the flux through the above described magnetic circuit is varied due to the varying reluctance of this circuit. The flux, therefore, linking the output winding or coil is also varied. Since the ferromagnetic means or flux collector is rotated at a speed proportional to vehicle speed, periodically varying electrical energy is induced in the output coil which has a frequency proportional to vehicle speed.

An object of the invention is the provision of an inexpensive and uncomplicated electrical generator for producing periodically varying electrical energy having a frequency proportional to vehicle speed that may be used for control purposes in the automotive vehicle.

Another object of this invention is the provision of an electrical generator which utilizes component parts of a mechanical speedometer already present in the automotive vehicle for producing periodically varying electrical energy having a frequency proportional to vehicle speed and that may be used for controlling other electronic or electrical systems in an automotive vehicle, particularly an electrical or electronic speed control system.

Other objects and attendant advantages of the present invention may be more readily realized as the specification is considered in connection with the attached drawings.

BRIEF DESCRIPTION OF THE DRAWINGS

FIGURE 1 is a schematic view partially in elevation and partially in cross section of one embodiment of the electrical generator of the present invention;

FIGURE 2 is a more detailed view of FIGURE 1 showing the mechanical speedometer employed in the present invention in a more detailed form;

FIGURE 3 is an end elevational view of another embodiment of the electrical generator of the present invention that employs component parts of a mechanical speedometer;

FIGURE 4 is a sectional view partially in elevation taken along the lines 4—4 of FIGURE 3;

FIGURE 5 is a sectional view partially in elevation taken along the lines 5—5 of FIGURE 3;

FIGURE 6 is a sectional view partially in elevation taken along the lines 6—6 of FIGURE 3; and FIGURE 7 is a partial end elevational view of the present invention taken in a direction opposite from the direction in which the end elevational view of FIGURE 3 is taken.

DESCRIPTION OF THE PREFERRED EMBODIMENT

Referring now to the drawings in which like reference numerals designate like parts throughout the several views thereof, there is shown in FIGURES 1, 2 and 4 the mechanical speedometer mechanism comprising a portion of the present invention. While there are minor differences between the speedometer mechanisms shown in FIGURES 1 and 2 and that shown in FIGURE 4, these three figures will initially be described together and the minor structural differences will be pointed out subsequently.

The mechanical speedometer 10 comprises a frame or housing 11 which may be constructed of a non-ferromagnetic material and has an axially extending bore 12 in which a sleeve bearing 13 is mounted. A speedometer shaft 14 is mounted within the sleeve bearing and it includes a gear 15 formed in the medial portion thereof which is adapted to engage another gear 17 that may be employed to drive the odometer (not shown) of the vehicle. The shaft 14 is adapted to be driven at a speed proportional to vehicle speed by a conventional speedometer cable that may be attached thereto in any conventional way. For example, the speedometer cable may be threaded onto the threads 18 positioned on the axially extending protuberance 19 as shown in FIGURE 2. As is conventional, the speedometer cable has an internal flexible member that is affixed to the speedometer shaft 14. The housing 11, as shown in FIGURE 4, also has a pair of threaded bores 20 and 21 that serve as a means for mounting the speedometer in an automotive vehicle. Of course, any other suitable means may be employed to perform this function.

The end portion of the speedometer shaft 14 adjacent the gear 15 includes an enlarged annular shoulder 23. A flux collector member, generally designated by the numeral 24, and constructed of a ferromagnetic material, a permanent magnet, generally designated by the numeral 25, and a temperature compensator, generally designated by the numeral 26, are positioned over the end of the shaft so that the flux collector member 24 engages the shoulder 23.

Any suitable means may be employed to hold the flux collector member 24, the permanent magnet 25 and the temperature compensator member 26 on the shaft 24. For example, the spring washer mechanism shown in Patent 3,111,037, issued Nov. 19, 1963 to G. C. Wallis, Jr., and assigned to the assignee of this invention, may be used to perform this function.

An eddy current speed cup assembly generally designated by the numeral 31 includes a cup having an axially extending flange 32 positioned between the ends of the permanent magnet 25 and the flux collector member 24, and a radially inwardly extending main body portion 33 connected to a hub 34. The hub 34 is affixed to a staff or shaft 35 which has one end 36 rotatably journalled within the speedometer shaft 14. For this purpose the speedometer shaft has an axially extending central bore 37 having a diameter larger than the diameter of the shaft 35 and a reduced bore 38 that receives end portion 36 of the shaft, and more specifically reduced end portion 39. Thus, the end 36 of the shaft 35 of eddy current speed cup assembly 31 is journalled within the speedometer shaft 14. For this purpose the speedometer shaft 14 may be constructed of a self-lubricating material or a conventional jewel type bearing (not shown) may be positioned within the speedometer shaft 14 to receive the reduced end portion 39 of the staff or shaft 35.

The other end of the eddy current speed cup assembly shaft or staff 35 is rotatably journalled within a bearing 41 that is threaded into a portion 42 of the housing or frame 11. The end of the shaft or staff 35 carries a pointer 43 that is positioned adjacent a speed scale, a portion of which is shown at 44. A hair spring 46 having one end affixed to hub 47 affixed to shaft or staff 35 and the other end affixed to the housing member 42 as shown at 48 is employed to bias the pointer 43 toward the zero position on the speed scale.

The flux collector member, generally designated by the numeral 24, as previously stated is constructed of a ferromagnetic material, and referring now to the embodiment of the invention shown in FIGURES 1 and 2, this flux collector member 24 has a main body portion 51 positioned on the speedometer shaft 14 in a plane generally perpendicular to the axis of the speedometer shaft 14 and the shaft 35 of the eddy current speed cup assembly 31. As can best be seen by reference to FIGURE 2, this main body portion 51 may be generally rectangular in form or the two sides of this rectangular body 51 may be considered to be radially extending teeth 52 and 53 for the purpose of this invention. The flux collector member 24 also has axially extending spaced means or teeth 54 and 55 that extend in a direction substantially perpendicular to the main body portion 51 and in a direction substantially parallel to the axes of the speedometer shaft 14 and the shaft 35 of the eddy current speed cup assembly 31. The means or teeth 54 and 55 may be thought of as axially extending teeth formed integrally with radially extending teeth 52 and 53 formed by the rectangular portion 51 of the flux collector 24.

Another form of the flux collector 24 is shown in FIGURE 4 and more specifically in FIGURE 7. This flux collector 24 has a main body portion 51 positioned in a direction generally perpendicular to the axis of the speedometer shaft 14 and the shaft or staff 35 of the eddy current speed cup assembly 31. This main body portion has cut-out notches 61 to form a plurality of radially extending teeth 62 which are positioned in a plane substantially perpendicular to the axis of the speedometer shaft 14 and the eddy current speed cup shaft or staff 35. A plurality of axially extending teeth 63 are formed on the main body portion 51 and more particularly on the radially extending teeth 62 of the flux collector 24 and they extend in a direction which is substantially perpendicular to the radially extending teeth 62 and hence in a direction substantially parallel to the axes of the speedometer shaft 14 and the eddy current speed shaft 35.

It can be appreciated from an inspection of FIGURE 4 that the axially extending teeth 63 are positioned in radially spaced relationship to the axially extending flange of the eddy current speed cup 32 and are substantially coextensive in length with it. The same holds true with respect to the axially extending teeth 54 and 55 formed on the main body portion 51 of the flux collector shown in the embodiment of the invention of FIGURES 1 and 2.

FIGURE 2 also discloses a stop means 66 for the eddy current speed cup mechanism 31 and hence the pointer 43 attached to the shaft or staff 35. This stop means may include a pin 67 affixed to the portion 42 of the housing or frame 11 and a radially extending arm 68 attached to the shaft 35. This is a conventional structure and may also be employed with the embodiment of the invention shown in FIGURES 3 through 7.

It can be appreciated that both embodiments of the invention, that is, the embodiment shown in FIGURES 1 and 2 and the embodiment shown in FIGURES 3 through 7 may employ a flux collector member 24 having any number of radially extending teeth and corresponding axially extending teeth. The radially extending teeth are designated by the numeral 62 in FIGURE 7 and by the numerals 52 and 53 in FIGURE 2 while the axially extending teeth are designated by the numeral 63 in FIGURES 4 and 7 and by the numerals 54 and 55 in FIGURES 1 and 2.

The eddy current cup mechanism 31 thus provides means mounted in the speedometer for indicating the speed of the vehicle and the permanent magnet 25 and the flux collector 24 provides means cooperating with this first mentioned means and rotatable at a speed proportional to vehicle speed for causing a speed indication proportional to vehicle speed.

The invention provides means responsive to the rotation of this second mentioned means and more particularly in response to the rotation of the flux collector member 24, which is constructed of a ferromagnetic material, for producing periodically varying electrical energy having a frequency proportional to vehicle speed. This periodically varying electrical energy may be used in the automotive vehicle as a control signal for other electrically or electronically operated systems in the vehicle, particularly an electronic or electrical speed control system.

In FIGURES 1 and 2 an electrical means 70 is shown which cooperates with the radially extending teeth 52 and 53 of flux collector 24 for producing a periodically varying electrical energy having a frequency proportional to vehicle speed. This electrical means 70 comprises a coil or winding 71 that is preferably wound or positioned around a permanent magnet 72 that is positioned in a direction parallel to the axis of the speedometer shaft 14 and, therefore, perpendicular to the main body portion 51 and radially extending teeth 52 and 53 of the flux collector 24. The permanent magnet 72 is polarized in an axial direction so that one pole 73 is positioned in closely spaced axial relationship with respect to the main body portion 51 and the radially extending teeth 52 and 53 of the flux collector 24. The other pole 74 is positioned in engagement with an end wall 75 of a container or housing 76 constructed of a ferromagnetic material that houses the coil or winding 71 and the permanent magnet 72. This housing 76 also includes a cylindrical wall 77 formed integrally with or in engagement with the end wall 75. The coil or winding 71 has output leads 81 and 82 that extend through the cylindrical wall 77, and a plastic insulating plug 83 closes the end of the ferromagnetic housing 76. The other end of the ferromagnetic housing 76 is closed by an annular plastic insulating plug 78 that engages the coil or winding 71 and has an aperture through which the permanent magnet 72 extends.

As a result of this structure a magnetic circuit is completed from the pole 74 through the ferromagnetic end wall 75 through the cylindrical sidewall 77, across the air gap between the ends of the ferromagnetic wall 76 and the other pole 73 of the permanent magnet 72. The magnetic flux between the pole 73 of the permanent magnet 72 and the end of cylindrical wall 77 will form an arcuate shaped magnetic field that may be intercepted by the radially extending teeth 52 and 53 of main body portion 51 of the flux collector 24.

The flux produced by the permanent magnet 72 thus links the coil or winding 71 and as the radially extending teeth 52 and 53 of the flux collector 24 pass adjacent the permanent magnet pole 73 and the end of the cylindrical wall 77 constructed of ferromagnetic material, the ferromagnetic material of the radially extending teeth 52 and 53 of the flux collector 24 causes a magnetic circuit of varying reluctance between the poles 74 and 73 of permanent magnet 72. This causes a varying or changing magnetic flux to link the winding or coil 71. This changing magnetic flux induces in the winding or coil 71 electrical energy or a voltage which is periodic in time and has a frequency proportional to the angular speed of the speedometer shaft 14 and the flux collector 24 and, therefore, has a frequency proportional to vehicle speed.

As shown in FIGURE 2 the electrical means 70 shown in FIGURE 1 including the ferromagnetic cylindrical wall 77 may be mounted in a bore 84 positioned in the frame or housing 11 constructed of nonferromagnetic material. To supply additional support for this means, a plate 85 with an internal bore 86 positioned therein aligned with bore 84 may be affixed to the frame or housing 11 with the bore 86 receiving the cylindrical wall 77. This support means 85 should also be constructed of a nonferromagnetic material so as not to interfere with the flux path previously described.

Referring now to the embodiment of the invention shown in FIGURES 3 through 7, the housing or frame 11 of the speedometer is provided with a plate 91 constructed of a ferromagnetic material that is affixed to a radially extending flange 92 of the housing 11. For this purpose, the radially extending flange 92 has a pair of bosses 93 and 94 preferably formed integrally with the housing or frame 11. The plate 91 is affixed to the radially extending flange 92 by means of a pair of threaded bolts 95 and 96 that are positioned or threaded into threaded bores in the bosses 93 and 94.

The plate 91 has a bore or aperture 100 positioned therein that receives one end of a permanent magnet 101 in a press-fit relationship. This can best be seen by reference to FIGURE 5. As shown here, the permanent magnet 101 is polarized in an axial direction and extends in a position such that its axis and the axis of polarization is parallel to the axis of the speedometer shaft 14 and the axially extending teeth 63 of the flux collector member 24. One of the magnetic poles is designated by the numeral 102 and the other is designated by the numeral 103. The permanent magnet has a radially inwardly extending portion 104 positioned closely adjacent the axially extending teeth 63 when one of the teeth 63 is in alignment with the extension 104 so that a small radial air gap 105 is provided between the extension 104 and one of the axially extending teeth 63. A bobbin 106 constructed of insulating material is positioned around the permanent magnet 102 and a coil or winding 107 is wound on the bobbin 106. The output leads 110 and 111 from the winding or coil 107 are enclosed in an insulating mounting means 112 that passes through an aperture 113 in the plate 91. An axially extending foam type dust seal 114 extends around a portion of the ferromagnetic plate 91 as can best be seen by reference to FIGURES 3 and 5 to seal this portion of the plate in an aperture in the instrument panel.

An axially extending ferromagnetic means 120, shown in the drawings as a rectangular pin, has one end 121 press-fitted in an aperture 122 in the plate 91 and it is spaced from the permanent magnet 101 circumferentially around the periphery of the flux collector member 24 as can best be seen by reference to FIGURE 7 so that the end portion 123 thereof will be in close radial spaced relationship with the axially extending teeth 63 of the flux collector member 24 as the flux collector 24 is rotated. As shown in FIGURE 6 an air gap 119 is positioned between one of the axially extending teeth 63 and this ferromagnetic means 120.

The extension 104 of the permanent magnet 101 extends axially over its length in a coextensive relationship with the axial length of the axially extending teeth 63 of the flux collector member 24 so that the radially extending air gap 105 has substantial axial length. Similarly, with respect to the positioning of the ferromagnetic means 120 shown in the form of the rectangular pin extends axially in such a position that the air gap 119 is of substantial length and is substantially equal to the length of the radial air gap 105 between the extension 104 of the permanent magnet 101 and the axially extending teeth 63.

The flux path for the magnetic circuit described above is best shown in FIGURES 5, 6 and 7 and is as follows: From the pole 102 of the permanent magnet 101 magnetic flux flows through the ferromagnetic plate 91, through the ferromagnetic means 120 preferably in the form of the pin, as shown, through the end portion 123 of this pin, across the air gap as shown in FIGURE 7, into one or more of the axially extending teeth 63 of the flux collector member 24. Flux then flows through the main body portion 51 and the radially extending teeth 62 of the flux collector depending upon the position of the flux collector 24, out through one or more of the axially extending teeth 63 positioned adjacent the extension 104 of the permanent magnet 101 to the pole 103 of the permanent magnet and then back to the other pole 102 of the permanent magnet.

With the flux collector member 24 positioned as shown in FIGURE 7, it can be seen that the air gap between the ferromagnetic member 120 and the ferromagnetic material of the flux collector 24 is large and, as a result, the reluctance of the magnetic circuit described above is high, resulting in a low value of magnetic flux linking the coil or winding 107. As the flux collector 24 is rotated by the speedometer shaft 14, and assuming a clockwise direction of rotation, as viewed in FIGURE 7, the leading edge of the tooth 63 positioned to the right of the ferromagnetic means 120 will come into closely spaced relationship with respect to this means while at the same time the trailing edge of the axially extending tooth 63 positioned adjacent the permanent magnet 101 will still be in close proximity to its extension 104. As a result, the reluctance of the magnetic circuit previously described is lowered substantially due to the reduction in the air gap between the ferromagnetic member 120 and the tooth 63 positioned to the right of it. As a result, substantially more flux links the coil 107. The flux linking the coil 107 is reduced as the flux collector 24 is rotated further clockwise since the tooth 63 positioned in closely spaced relationship to the extension 104 on the permanent magnet 101 will move into a position where the air gap between the extension 104 and this axially extending tooth 63 is large.

Thus as the flux collector member 124 is rotated, a time varying magnetic flux will link the winding or coil 107 thereby inducing a time varying voltage or electrical energy output in the winding 107. This time varying electrical energy output or voltage is periodic and it has a frequency proportional to the frequency of rotation of the flux collector 24 which is driven by the speedometer shaft 14. Since the speedometer shaft is driven at an angular speed proportional to the speed of a motor vehicle, the time varying electrical energy will have a frequency proportional to vehicle speed. The number of teeth 63 positioned on the flux collector member 24 determines the number of periodic output voltage wave forms produced in the coil or winding 107 per revolution of the speedometer shaft 14 and the flux collector 24. The greater the number of teeth, the greater the number of these periodic waveforms. Thus, the greater the number of teeth, the greater will be the frequency of the periodic electrical energy or voltage produced in the coil or winding 107.

It is readily apparent from an inspection of the drawings that the flux collector 24 shown in FIGURE 7 could also be used with the embodiment of the invention shown in FIGURES 1 and 2 to produce alternating or periodically varying electrical energy having a greater frequency than that will be produced with the flux collector member 24 shown in FIGURES 1 and 2. It will be understood that the frequency of the alternating or periodically varying energy electrically produced by the output coil or winding 107 will be proportional to the number of teeth on the flux collector 24 as well as being proportional to the speed of the motor vehicle.

Thus, the present invention provides a very inexpensive, uncomplicated electrical generator for producing periodically varying electrical energy that may be used in an automotive vehicle and which has a frequency proportional to vehicle speed. This electrical energy may be used to control various other electrical or electronic systems in the vehicle, for example, it may be used to provide an input signal to an electric or electronic speed control system. The electrical generator comprises, in part, components already present in the vehicle, that is, a rotating portion of the mechanical speedometer positioned in the vehicle and, in particular, the rotating flux collector member of the speedometer which rotates at a speed proportional to vehicle speed.

It is to be understood that this invention is not limited to the exact construction illustrated and described above but that various changes and modifications may be made without departing from the spirit and scope of the invention as defined by the appended claims.

What is claimed is:

1. An electrical generator for producing periodically varying electrical energy for use in an automotive vehicle and having a frequency proportional to vehicle speed, the combination comprising a speedometer for indicating vehicle speed including a frame, a shaft rotatably mounted in said frame and adapted to be rotated at a speed proportional to vehicle speed, means mounted in said speedometer for indicating the speed of the vehicle, and means mounted on said shaft and cooperating with said first mentioned means for causing a speed indication proportional to vehicle speed, and means mounted on said frame adjacent said means mounted on said shaft and responsive to the rotation of said means mounted on said shaft for producing periodically varying electrical energy having a frequency proportional to vehicle speed, said means mounted on said shaft including a permanent magnet positioned on said shaft in a direction substantially perpendicular to the axis of said shaft and a flux collector having a main body portion affixed to said shaft in a direction generally perpendicular to the axis of said shaft and a plurality of teeth extending in a direction generally parallel to the axis of said shaft and radially spaced from the ends of said permanent magnet, said means mounted in said speedometer for indicating the speed of the vehicle comprising an eddy current speed cup assembly positioned between the ends of said permanent magnet and said flux collector, and said means for producing periodically varying electrical energy comprising means cooperating with said flux collector for producing periodically varying electrical energy having a frequency proportional to vehicle speed, as said flux collector is rotated.

2. The combination of claim 1 in which the main body portion of said flux collector is of generally rectangular configuration, and said means for producing periodically varying electrical energy comprises a reluctance pickup mounted in said frame of said speedometer, said reluctance pickup having a permanent magnet, a winding and a ferromagnetic material having a magnetic flux path completing a partial magnetic circuit from said last mentioned permanent magnet through said material, said flux path including an air gap at one end of said last mentioned permanent magnet, said reluctance pickup being mounted in said frame of said speedometer and having the air gap of the flux path positioned in close proximity to said main body portion of said flux collector whereby when said flux collector is rotated by said shaft the flux linking said winding is altered as said main body portion is moved through the air gap of the flux path.

3. The combination of claim 2 in which the winding of said reluctance pickup is wound around said last mentioned permanent magnet, said last mentioned permanent magnet being polarized in an axial direction, and said ferromagnetic material has a portion in engagement with the other end of said last mentioned permanent magnet and another portion extending axially along the sides of the coil, said other portion terminating adjacent said one end of said last mentioned permanent magnet whereby the air gap is formed between said one end of said last mentioned permanent magnet and said other portion of said magnetic material, said reluctance pickup being positioned in said frame in a direction parallel to the axis of the magnet and shaft, said main body portion of said flux collector moving into and out of said air gap as said flux collector is rotated by said shaft, whereby the magnetic flux from said last mentioned permanent magnet linking said coil is periodically increased and decreased.

4. The combination of claim 1 in which said main body portion of said flux collector has a plurality of axially extending teeth positioned around the periphery thereof, said teeth extending in a direction generally parallel to the axis of said shaft, and said means for producing periodically varying electrical energy comprises a plate constructed of ferromagnetic material attached to said frame, a permanent magnet extending in a direction generally parallel to said shaft affixed to said plate, said last mentioned permanent magnet being polarized in an axial direction, an output winding positioned about said last mentioned permanent magnet, means constructed of ferromagnetic material affixed to said plate and extending in a direction generally parallel to said shaft and said last mentioned permanent magnet, said last mentioned permanent magnet and said last mentioned means being positioned radially outwardly of said axially extending teeth and in close proximity thereto, said last mentioned permanent magnet and said last mentioned means being spaced apart circumferentially about the axially extending teeth of said flux collector.

5. The combination of claim 4 in which said last mentioned permanent magnet and said means constructed of ferromagnetic material extend for a substantial distance axially along said axially extending teeth.

6. The combination of claim 5 in which said main body portion of said flux collector has a plurality of notches positioned therein between said axially extending teeth.

7. The combination of claim 6 in which said last mentioned permanent magnet and said means constructed of ferromagnetic material affixed to said plate are spaced apart a distance substantially equal to the distance between an edge of one of said axially extending teeth and the adjacent edge of the adjacent tooth.

8. An electrical generator for producing periodically varying electrical energy for use in an automotive vehicle and having a frequency proportional to vehicle speed, the combination comprising a frame constructed of non-ferromagnetic material, a shaft rotatably supported in said frame and adapted to be rotated at a speed proportional to the speed of the vehicle, a first permanent magnet and a flux collector affixed to said shaft, eddy current cup means positioned intermediate said first permanent magnet and said flux collector, speed indicating means attached to said eddy current cup means, said eddy current cup means and said indicating means being rotatably supported in said speedometer frame independently of said shaft, a second permanent magnet, a coil, and means for linking the magnetic flux of said second permanent magnet with said coil, said second permanent magnet and said coil being supported by said frame in a position adjacent said flux collector, said flux collector including means for changing the magnetic flux linking said coil as said shaft and said flux collector are rotated.

9. The combination of claim 8 in which said flux collector has a main body portion positioned substantially perpendicularly with respect to the axis of said shaft, said main body portion having a plurality of radially extending teeth, and said second permanent magnet extends in a direction substantially parallel to said shaft and positioned adjacent the radially extending teeth of said flux collector.

10. The combination of claim 8 in which said flux collector has a main body portion positioned substantially perpendicularly with respect to the axis of said shaft and a plurality of axially extending teeth positioned about the periphery thereof extending in a direction substantially parallel to the axis of said shaft, said second permanent magnet being positioned radially outwardly of said axially extending teeth, and said means for linking the magnetic flux of said permanent magnet with said coil including a ferromagnetic means spaced from said permanent magnet circumferentially about said flux collector and extending axially along said axially extending teeth.

References Cited

UNITED STATES PATENTS

| | | | |
|---|---|---|---|
| 2,669,669 | 2/1954 | Spaulding | 324—70 |
| 2,715,723 | 8/1955 | Webster | 340—263 |
| 2,978,599 | 4/1961 | Wilcox | 310—168 |
| 3,134,918 | 5/1964 | Eichenberger et al. | 324—70 |
| 3,257,612 | 6/1966 | Gorrill et al. | 324—70 |

JAMES J. GILL, Primary Examiner

H. GOLDSTEIN, Assistant Examiner

U.S. Cl. X.R.

73—519; 324—70